United States Patent
Kermani et al.

(10) Patent No.: US 6,504,528 B1
(45) Date of Patent: Jan. 7, 2003

(54) MAGNETIC MOUSE AND/OR MOUSE-PAD

(75) Inventors: Bahram G. Kermani, Whitehall, PA (US); Surender Dayal, Allentown, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/483,784

(22) Filed: Jan. 14, 2000

(51) Int. Cl.$^7$ ................................................ G09G 5/00
(52) U.S. Cl. ...................................... 345/163; 345/156
(58) Field of Search ................................ 345/163, 167, 345/173, 184, 158, 164, 156; 340/407.1, 407.2

(56) References Cited

U.S. PATENT DOCUMENTS

| | | | | |
|---|---|---|---|---|
| 4,868,549 A | * | 9/1989 | Affinito et al. | 345/164 |
| 5,525,901 A | * | 6/1996 | Clymer et al. | 324/207.21 |
| 5,696,537 A | * | 12/1997 | Solhjell | 345/164 |
| 5,765,795 A | * | 6/1998 | Alex | 248/346.01 |
| 5,805,144 A | * | 9/1998 | Scholder et al. | 345/163 |
| 5,826,874 A | * | 10/1998 | Teitell et al. | 473/225 |
| 5,834,709 A | * | 11/1998 | Blonder et al. | 178/18.01 |
| 6,128,006 A | * | 10/2000 | Rosenberg et al. | 345/161 |
| 6,191,774 B1 | * | 2/2001 | Schena et al. | 345/163 |
| 6,285,355 B1 | * | 9/2001 | Chang | 345/156 |

FOREIGN PATENT DOCUMENTS

JP    05257596 A   * 10/1993   ........... G06F/3/033

* cited by examiner

*Primary Examiner*—Vijay Shankar
*Assistant Examiner*—Nitin Patel
(74) *Attorney, Agent, or Firm*—Synnesvedt & Lechner LLP

(57) ABSTRACT

The invention is a computer mouse-device/mouse-pad combination in which the mouse device and mouse-pad are magnetically attracted to each other so that a mouse device will stay fixed to the mouse-pad when the mouse-pad is at an angle to the horizontal. Preferably, the mouse device is magnetized by an electromagnetic magnet which is controlled to be sensitive to the touch of the user such that the magnetic force is weakened or turned off when the user touches the mouse device and is turned on full force when the user's hand is not in contact with the mouse device.

22 Claims, 4 Drawing Sheets

MAGNETIC MOUSE AND/OR MOUSE-PAD

FIELD OF THE INVENTION

The invention pertains to computer mouse devices for controlling cursors on computer displays.

BACKGROUND OF THE INVENTION

The use of pointers on graphical user interfaces (GUIs) presented on a computer display device for interacting with application software is well known. Essentially all Windows™ based or McIntosh™ based software utilizes such control. Accordingly, apparatus for moving the pointer on a computer screen also are well known to computer users. Probably the most common pointer control device is the well known computer mouse device such as illustrated in FIG. 1. A computer mouse device 10 comprises a shell 12 shaped to fit conveniently and comfortably in the palm of the hand of the user while it rests on a flat, horizontal surface. It typically has two or more buttons 16 and 18 on its top surface positioned to be adjacent the operator's, index, middle and/or ring fingers when the mouse device is gripped comfortably. Protruding from the bottom of the shell typically is a track ball or other mechanism (not shown in FIG. 1) which, responsive to the user moving the mouse device on top of the horizontal supporting surface, rotates due to friction with that surface. The track ball is coupled to circuitry (not shown in FIG. 1) encased within the shell 12 which determines the direction and rate of rotation of the track ball and converts it to an electrical signal that is provided to the computer via a cable 19 that extends from the mouse device to a mouse port on the computer. Software within the computer takes that information and converts it into corresponding movements of the pointer on the computer display device.

Although computer mouse devices of the general form shown in FIG. 1 are probably the most common type of pointer control device for desktop computers, many other types of computer pointer control devices are known. This is particularly true in connection with portable computers (e.g., laptop computers and palmtop computers) since computer mouse devices tend to be too cumbersome for portable use. Well known computer control devices other than a mouse device include track balls, touch pads, and touch pens. It also is known to use mouse devices that include a light emitting diode that are used in connection with mouse-pads that are reflective and contain a grid. Interruptions in the light intensity are used to indicate movement of the mouse.

While a computer mouse device can, in theory, be moved across any horizontal surface, the rotation of the track ball works on the basis of friction with that surface. Accordingly, if the surface is too smooth, the track ball may nor rotate as smoothly as desired and mouse device operation may be less than ideal. A typical desktop, for instance, is quite smooth and does not yield mouse device operation that is considered adequate to the typical user. Accordingly, most mouse device users also utilize a mouse-pad which is basically a small pad typically measuring approximately 9"×8" made of a soft, high friction material such as neoprene.

The surface on which a computer mouse device is used must be horizontal. If the surface is not horizontal, the force of gravity will cause the mouse device to roll off of the surface.

Many office and factory workers now use computers on a regular basis for great lengths of time. Many jobs require computer use every day for anywhere between several hours a day and the entire work day. Using a mouse device on a flat surface, be it a desktop, or a mouse-pad that is resting on a desktop, requires the user to sit or stand near the desk. However, when working with a computer for such long lengths of time, workers often find it desirable to recline in their chairs or stretch out their legs such that they are more than an arm's length away from the desktop and thus the mouse device. Accordingly, it is desirable to have a surface on which a mouse device can be used that is attached to the chair so that the user need not always remain so close to his or her desk. Further, it would be desirable for this surface to be inclined towards the user to allow more comfortable use of the mouse device, even if the user is near a desktop.

However, the mounting of such a surface, to a chair or even to a fixed station but at an incline creates problems. First, a standard mouse device will not remain on an inclined surface. As noted above, it will slide off of the surface due to gravity as soon as the user removes his hand from the mouse device. Further, even if the surface is perfectly horizontal, but it is mounted on a mobile item, such as a chair, acceleration of the surface might cause the mouse device to slide off of the surface, hit the floor and possibly break or become disconnected from the computer.

Accordingly, it is an object of the present invention to provide an improved mouse device.

It is another object of the present invention to provide an improved mouse-pad and/or mouse support surface.

It is a further object of the present invention to provide an improved mouse-device/mouse-pad combination.

SUMMARY OF THE INVENTION

In accordance with the invention, a mouse-device/mouse-pad combination is provided in which one of the mouse device and mouse-pad includes a magnet and the other includes a ferromagnetic material. Alternately, both the mouse device and the mouse-pad may comprise a magnet. The magnet may be a permanent magnet or an electromagnet. The magnetic force between the mouse device and the mouse-pad should be set such that the mouse device is held securely on the pad when the pad is tilted to any reasonably expected angle from the horizontal yet weak enough such that the user can overcome the magnetic force to move the mouse device along the surface without undo exertion. If an electromagnet is utilized in the mouse device and/or mouse-pad, then the mouse device or mouse-pad can be equipped with a knob for allowing the user to adjust the magnetic force relative to the angle at which the user intends to place the mouse-pad and/or the amount of force the user wishes to exert to move the mouse device.

In a preferred embodiment, the mouse-device/mouse-pad combination is touch sensitive and is configured such that the magnetic force is turned off or at least substantially reduced when the user's hand comes in contact with the mouse device. In this manner, a high electromagnetic attractive force can be allowed to exist between the mouse-pad and the mouse device when the user is not in contact with the mouse device in order to securely hold the mouse device to the mouse-pad. When the user comes in contact with the mouse device, the force will be eliminated or substantially decreased so that the user can easily move the mouse device and thus not become fatigued or suffer from a repetitive stress disorder. In this manner, the mouse device can be guaranteed not to slide off of the mouse-pad when not in use yet can be manipulated easily by the user without the need to overcome a strong electromagnetic attractive force between the mouse device and mouse-pad.

DETAILED DESCRIPTION OF THE INVENTION

Figure 1:
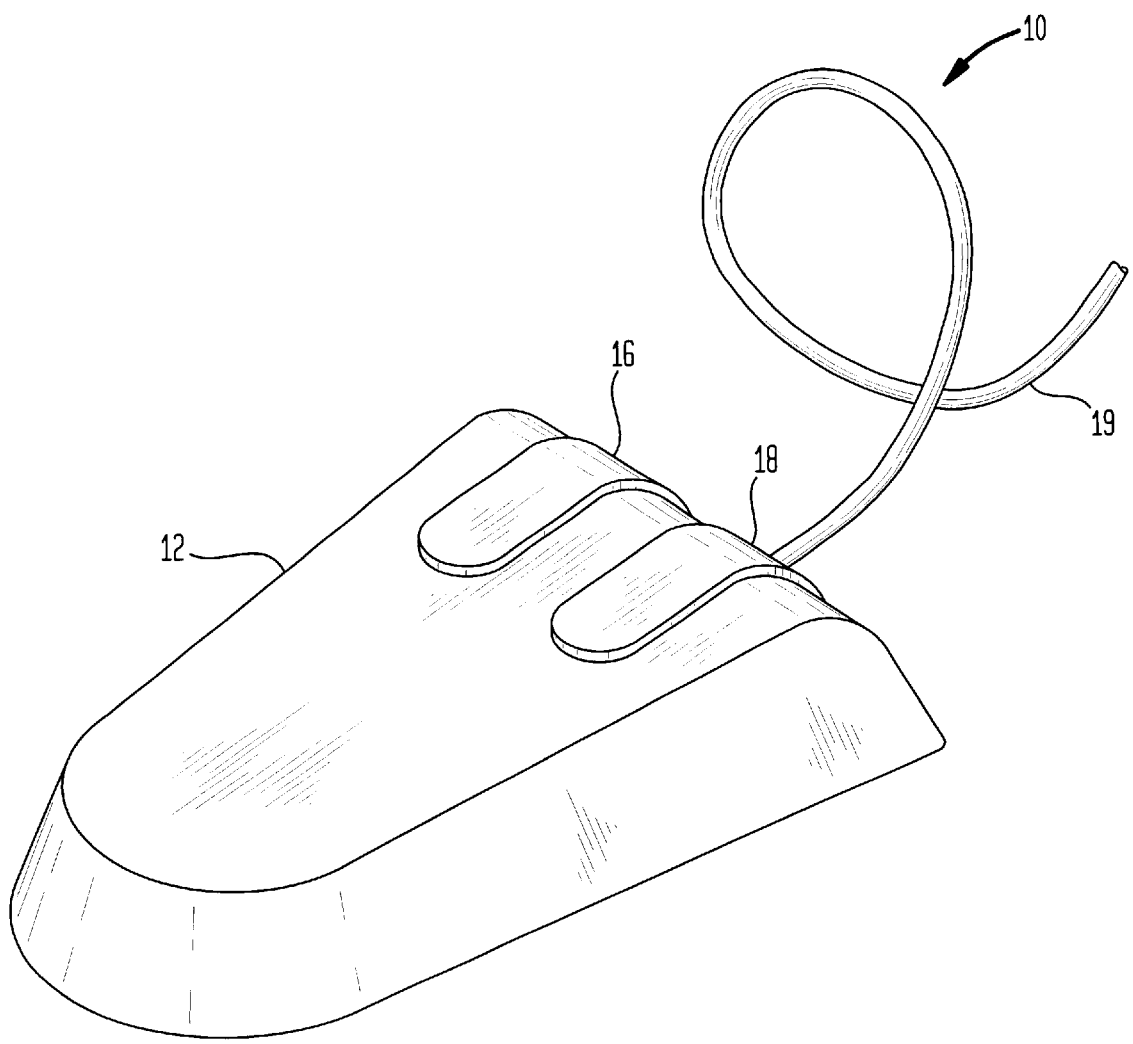
FIG. 1 is a perspective view of a computer mouse device of the prior art.
Figure 2:
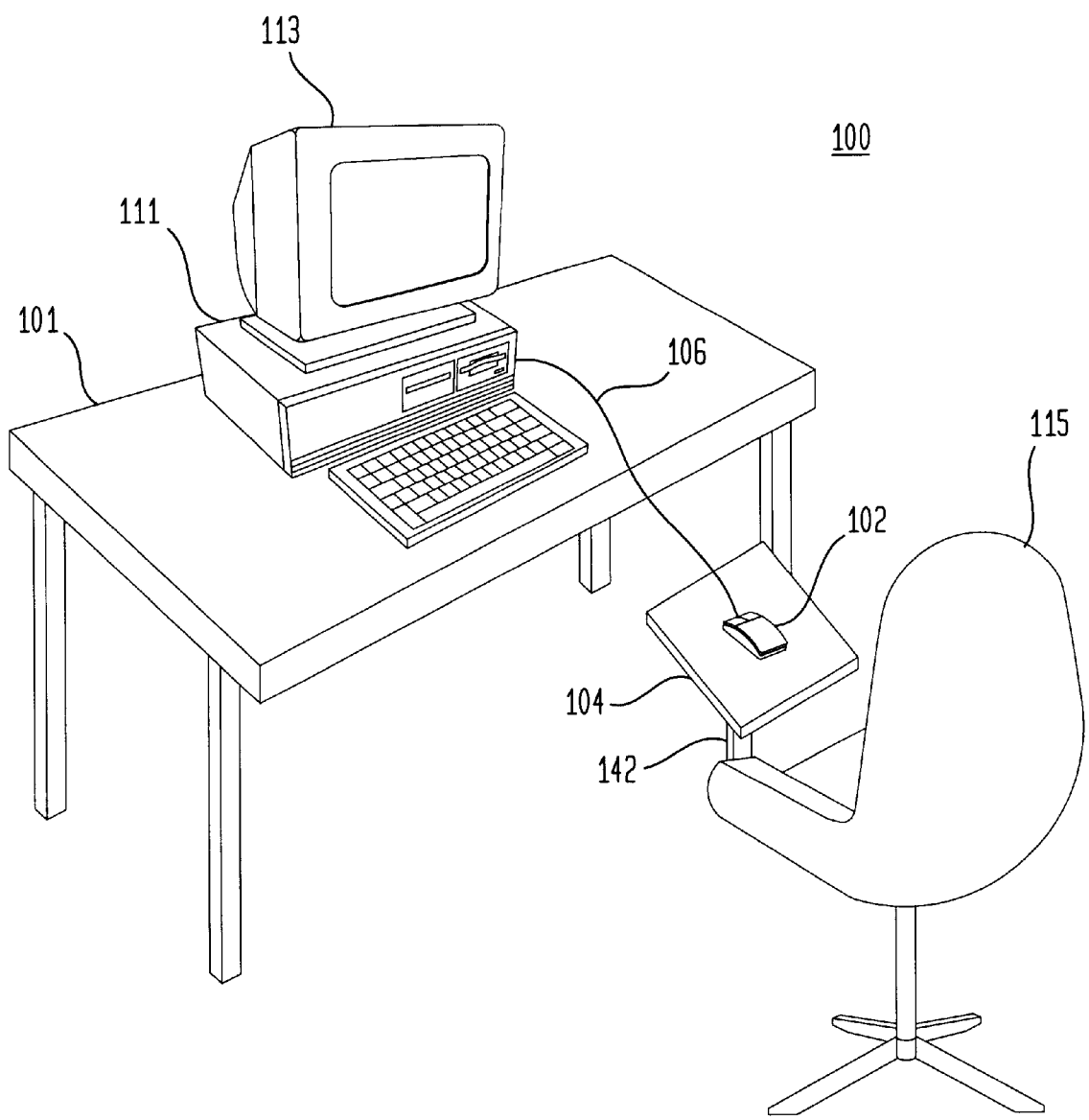
FIG. 2 is a perspective view of an office workstation including a computer mouse-device/mouse-pad combination in accordance with the present invention.

FIG. 2 shows a work station 100 in which the present invention is in use. The work station includes a desk 101, a computer 111, a computer monitor 113, and a reclining chair 115. In accordance with the invention, a mouse device 102 and mouse-pad 104 are provided in which the mouse device 102 and mouse-pad 104 are magnetically attracted to each other. Accordingly, at least one of the mouse device and mouse-pad includes a magnet. The other includes a material subject to magnetic force. The term ferromagnetic will be used in this specification to broadly denote materials that are subject to magnetic force, such as iron, steel and certain other metals, and including magnets themselves, whether they be permanent magnets, electromagnets or otherwise. Alternately, both the mouse device and the mouse-pad can contain magnets that are oppositely polarized relative to each other, e.g., the top surface of the mouse-pad is magnetic north while the bottom surface of the mouse device is magnetic south.

The magnetic attractive force between the mouse device and the mouse-pad should be strong enough such that the mouse device will be held to the mouse-pad at all reasonable angles to which the mouse-pad may be tilted. However, the attractive force should be small enough that the user of the mouse device can move the mouse device without the need to exert excessive force in order to avoid fatigue and/or avoid repetitive stress disorders from manipulating the mouse device. The magnetic force between the mouse-pad and the mouse device should be consistent over the entire surface of the mouse-pad. Accordingly, the mouse-pad should be constructed of a ferromagnetic material that is spread uniformly throughout the pad and that has uniform magnetic properties. If comprised of an electromagnet, the electromagnetic magnet should be designed to present a uniform field over the entire surface of the mouse-pad.

Figure 3:
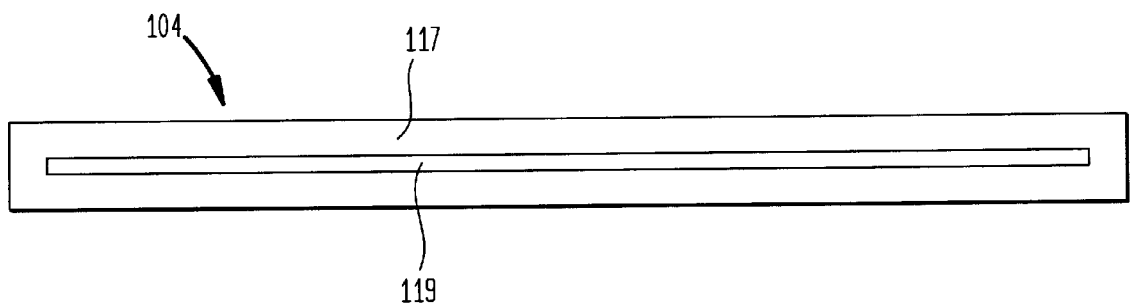
FIG. 3 is a cross-sectional view of a mouse-pad in accordance with the present invention.

In one embodiment, the mouse-pad 104 can be constructed entirely of a flat sheet of a ferromagnetic material, such as steel (which comprises iron). However, as in the case with a regular mouse-pad, it is desirable that there be reasonable friction between the mouse device and mouse-pad and that the mouse-pad be comfortable to the user. Accordingly, in a preferred embodiment such as illustrated in cross-section in FIG. 3, the mouse-pad 104 in accordance with the present invention includes a neoprene or similar surface material 117 surrounding a steel sheet 119.

Preferably, only one of the mouse device and the mouse-pad comprises a magnet while the other comprises a ferromagnetic material. Even more preferably, it is the mouse device which contains the magnet. This embodiment is believed preferable because magnets, whether permanent or electromagnetic, tend to be heavier and/or more expensive than widely available ferromagnetic materials that are subject to the magnetic force but are not strong magnets themselves. Accordingly, since the mouse-pad is the larger of the two devices and, as noted above, preferably has uniform magnetic strength over its entire surface, it is preferable to construct the mouse-pad of the less expensive, lighter material.

Figure 4:
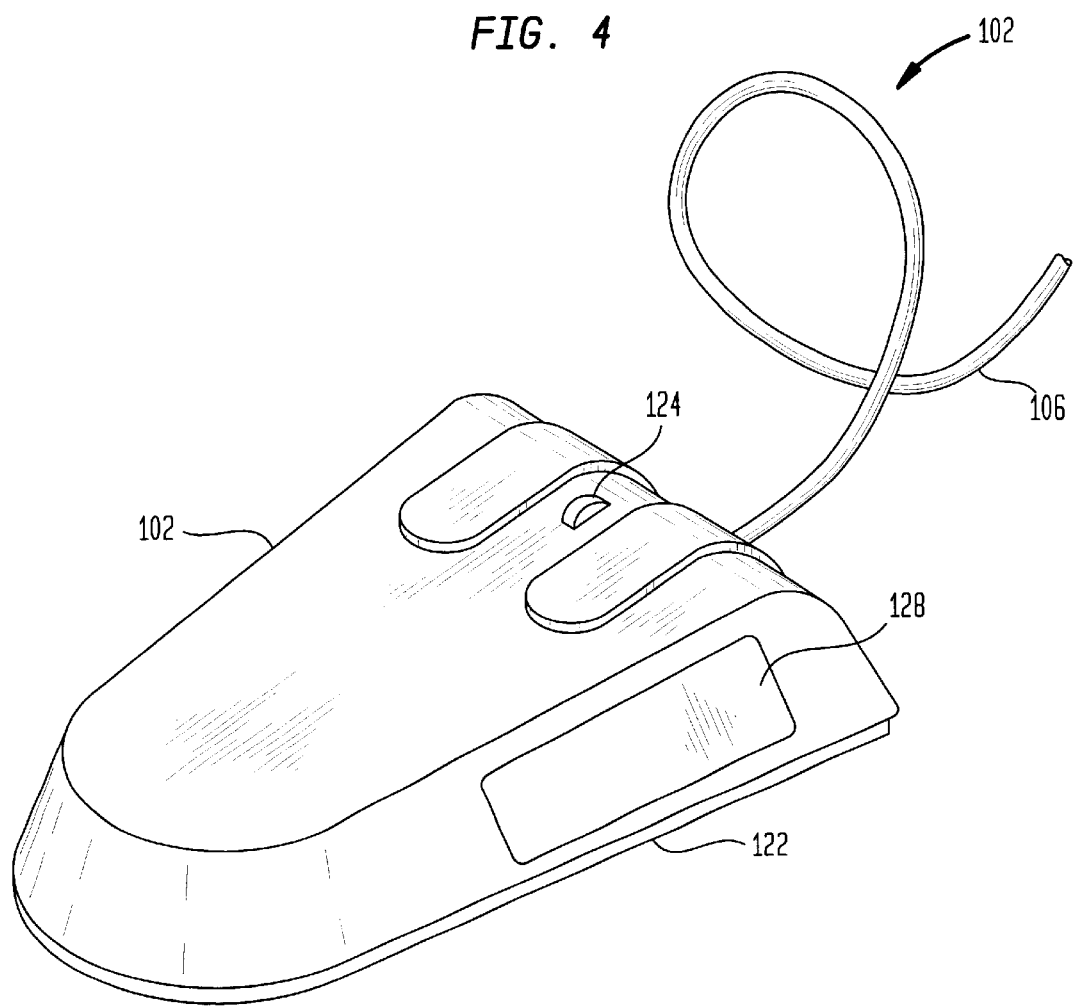
FIG. 4 is a perspective view of a mouse device in accordance with the present invention.
Figure 5:
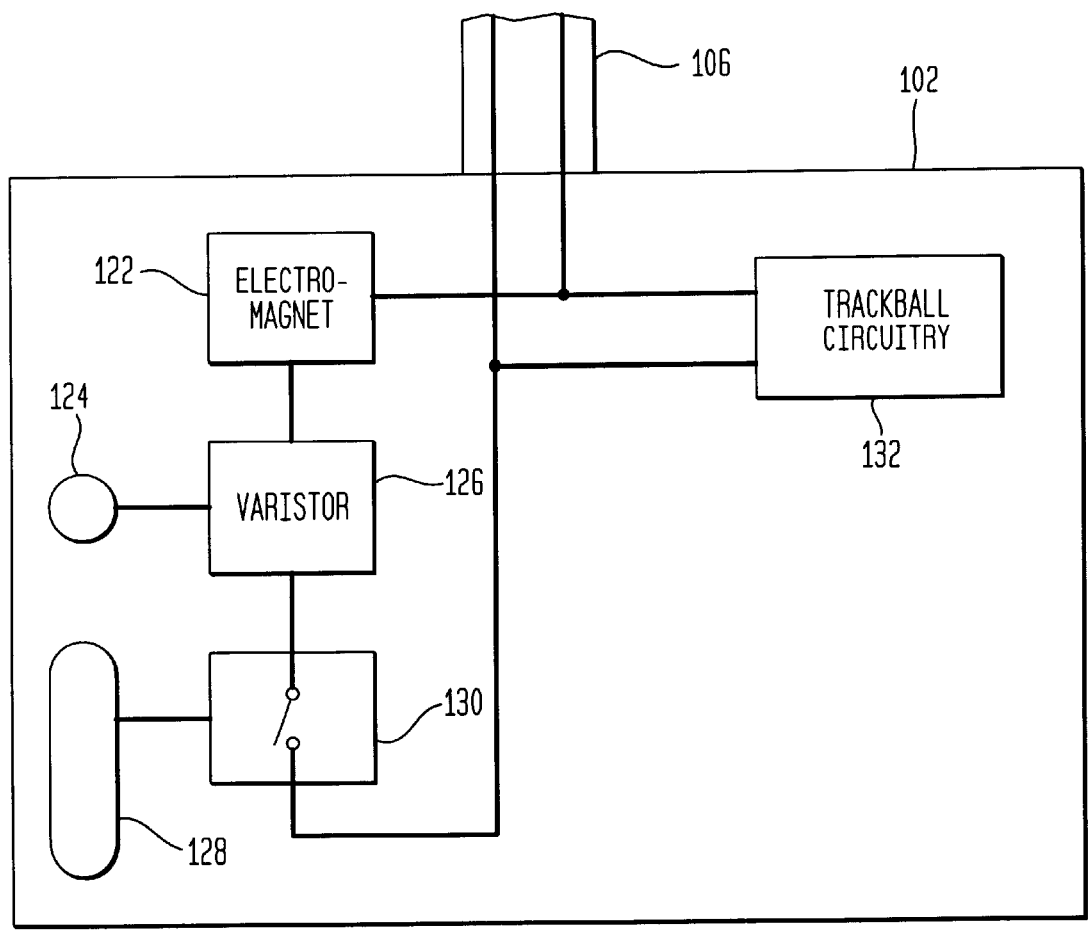
FIG. 5 is a circuit diagram of a mouse device in accordance with the present invention.

In addition, in certain embodiments, electromagnets may be preferable to permanent magnets. First, the force of an electromagnet can be varied. Referring now to FIG. 4, which is a perspective view of a mouse device in accordance with the present invention, and FIG. 5, which is a circuit diagram of a mouse device in accordance with the present invention, an electromagnet 122 is mounted on the bottom surface of the mouse device 102. Further, the mouse device includes a knob 124 which controls the amount of current allowed to flow through the electromagnet in the mouse device in order to adjust its force. For instance, a varistor 126 controlled by the knob 34 may be embodied within the body of the mouse device. Therefore, the user can adjust the magnetic force to a strength which allows the mouse device 102 to remain fixed to the mouse-pad 104 at the particular angle at which the user is using it and allow for comfortable use of the mouse device without excessive exertion. If the user changes the angle of the mouse-pad 104, he or she can adjust the strength of the magnetic field to a level that keeps the mouse device attached to the mouse-pad, but is low enough to not require excessive force for the user to move the mouse device when needed. Thus, as conditions of use change or as the user changes, the magnetic force between the mouse device and the mouse-pad can be adjusted instantaneously by the user.

Another reason why it is preferable to have the electromagnet in the mouse device rather than the mouse-pad is the fact that the mouse device, unlike the mouse-pad, typically is electrically coupled to the computer by a cable 106 independently of the present invention so that the mouse device can receive power for operating the trackball circuitry and transmit the trackball rotation information to the computer. Accordingly, the cable between the mouse device and the computer can simply include an additional wire for providing current to the electromagnet in the mouse device. In fact, the current for powering the electromagnet may not require a separate electrical connection. Rather, it may simply tap off of the current provided to operate the trackball circuitry.

If an electromagnet is provided in the mouse-pad rather than the mouse device, then the mouse-pad must receive some power for powering the electromagnet. Accordingly, the pad itself would either need to be plugged into the computer, an AC outlet in the wall or be battery powered. Placing the electromagnet in the mouse device is a much simpler solution.

Nevertheless, the invention can be used in connection with wireless mouse devices such as those that use infrared or radio frequency communication with the computer. However, such a mouse device would require its own power source such as a battery to power the electromagnet.

In an even more preferred embodiment of the invention, the surface of the mouse device includes a touch sensitive portion 128 so that the mouse device is capable of sensing when a user is touching the mouse device. A detection circuit 130 turns off the current to the electromagnet in the mouse device or substantially reduce the current to it when the user's hand is in contact with the mouse device. In this manner, the full force of the magnet can be applied to hold the mouse device to the mouse-pad firmly so that the mouse device will be held to the mouse-pad at very high angles from the horizontal. Yet, when the user needs to move the mouse device, the force is weakened responsive to the user's touch so that the user can move it very easily.

The touch sensitive surface may be positioned, for instance, on a side surface of the mouse device as illustrated in FIG. 4 where the user's thumb or ring finger might ordinarily rest when holding the mouse device. Various means of providing touch sensitivity are well known in the art. One well known touch sensitive mechanism involves the provision of an electrically conductive surface 128 that is open circuited or has a very high resistance. When the user comes in contact with the surface 128, the contact closes the circuit thus allowing current to run to a detection circuit 130. When the detection circuit 130 detects current, it is known that the user's hand is in contact with the surface. Other touch sensitive mechanisms are known and the above-described type of system is merely one example.

In another preferred embodiment of the invention, the mouse-pad is equipped with an arm 142 with a mounting mechanism for mounting the mouse-pad on the chair 115 or another piece of furniture. Further, the arm should be coupled to the mouse-pad by a mechanism that allows angular adjustment of the mouse-pad 104 relative to the arm 42 so that the user can place the mouse-pad at whatever angle he or she desires. Many such mechanisms are well known in the art, such as two mating, castellated circular plates joined by a central screw/nut combination. One plate is fixedly coupled to the mouse-pad and the other is fixedly coupled to the arm. The operator may loosen the screw/nut enough to allow the plates to separate enough from each other so that the mating castellations can clear each other so that the two plates can be rotated relative to each other. When the desired relative rotations of the plates is reached, the screw/nut combination can be retightened.

In another embodiment, the mouse-pad or coupling mechanism may be equipped with a sensor for detecting the angle of the mouse-pad. This information can be sent to the computer or directly to the mouse and the magnetic force applied can be controlled as a function of the angle of the mouse-pad. For instance, a sensor comprising a variable resistor can be embodied in the coupling mechanism which provides a different resistance depending on the relative angle of the two plates. The resistance can be measured and used to adjust the strength of the magnetic field. A drawback of this approach is that the position of the arm may change (for example, if it were mounted on a reclining chair) and thus the relative position of the two plates does not necessarily give the relative angle of the mouse-pad to the horizontal plane. In another embodiment, a gravitational direction sensor can be incorporated in the body of the mouse-pad and can be used to generate a signal indicative of the angle of the mouse-pad to the horizontal plane. Many such mechanisms are well known.

In a further embodiment of the invention, the mouse can contain more than two buttons and one of the buttons can be used simply as an on/off switch for the magnetic force. In this embodiment, the use of an electromagnet in the mouse device would result in the most practical embodiment.

Even further, the magnetic force can be software driven. That is, the computer may include software that allows the user to adjust magnetic force manually or allow the user to set parameters by which magnetic force can be set automatically by the software based on user inputs such as angle of mouse-pad and strength of user.

It should be noted that it is not necessary that the mouse device and mouse-pad be provided together. For instance, many users may already have a ferromagnetic surface which is attached or at least can be attached to their chair. Accordingly, the user would not need to purchase a new mouse-pad, but would merely need a mouse device in accordance with the present invention. Further, some mouse devices may have sufficient ferromagnetic components within them such that they may not need to purchase a new mouse device but merely a magnetic mouse-pad. However, it is likely that the amount of ferromagnetic material in a typical mouse device is relatively small such that the mouse-pad that would need to be used in connection with such a device would need to be able to produce a relatively strong magnetic force.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

I claim:

1. A computer mouse device and mouse-pad system comprising:
    a computer mouse device for controlling the position of a cursor within a display device;
    a mouse-pad for use in connection with said mouse device;
    wherein one of said mouse device and said mouse-pad comprises an electromagnet and the other comprises a ferromagnetic material wherein said electromagnet is adapted to exert sufficient magnetic force relative to said ferromagnetic material to hold said mouse from moving relative to said mouse-pad when said mouse pad is at an angle relative to horizontal with said mouse in contact with said mouse-pad; and
    a user operable input device for allowing a user to selectively adjust a strength of said electromagnetic force.

2. The system of claim 1 wherein said mouse device comprises said magnet and said mouse-pad comprises a ferromagnetic material.

3. The system of claim 2 wherein said mouse-pad comprises a sheet of material containing iron.

4. The system of claim 3 wherein said sheet of material containing iron has at least one surface and said mouse-pad further comprises a neoprene sheet covering at least said one surface of said sheet of material containing iron.

5. The system of claim 2 wherein said user operable input device comprises a knob on said mouse for controlling said strength of said magnetic force.

6. The system of claim 2 wherein said mouse device further comprises a touch sensitive surface for detecting when a user is in contact with said mouse device and a circuit for controlling said electromagnet such that said electromagnet generates a first magnetic force when said user is in contact with said mouse device and a second magnetic force when said user is not in contact with said mouse device, wherein said first magnetic force is less than said second magnetic force.

7. The system of claim 6 wherein said first magnetic force is zero.

8. The system of claim 7 wherein said user input device adjusts the strength of said second magnetic force.

9. The system of claim 2 wherein said mouse device further comprises a cable for connecting said mouse device to a computer, said cable including an electrical path for providing current from said computer to said electromagnet.

10. The system of claim 1 further comprising an arm adjustably coupled to said mouse-pad at a first end of said arm and a first mounting device for mounting a second end of said arm to furniture.

11. The system of claim 10 wherein said arm comprises a second mounting device coupled between said first end of said arm and mouse-pad, said second mounting device allowing adjustability of an angular relationship between said arm and said mouse-pad.

12. The system of claim 11 wherein:

said magnet is an electromagnet;

said system further comprises a sensor for sensing the angle of said mouse-pad relative to said arm; and said system further comprises circuitry for adjusting a force of said electromagnet responsive to said sensor.

13. The system of claim 11 further comprising:

a sensor for sensing the angle of said mouse-pad relative to a horizontal plane; and circuitry for adjusting a force of said electromagnet responsive to said sensor.

14. The system of claim 1 wherein said magnetic force is consistent over the entire mouse-pad.

15. A computer mouse device for controlling the position of a cursor within a display device, said computer mouse device for use with a ferromagnetic mouse-pad, said mouse device comprising an electromagnet such that said mouse device will be held by magnetic force to said mouse-pad wherein said electromagnet is adapted to exert sufficient magnetic force relative to said ferromagnetic mouse-pad to hold said mouse from moving relative to said mouse-pad when said mouse pad is at an angle relative to horizontal with said mouse in contact with said mouse-pad; and a user operable input device for allowing a user to selectively adjust a strength of said electromagnetic force.

16. The mouse device of claim 15 wherein said user operable input device comprises a knob on said mouse for controlling said strength of said magnetic force.

17. The mouse device of claim 15 wherein said mouse device further comprises a touch sensitive surface for detecting when a user touches said mouse device and a circuit for controlling said electromagnet such that said electromagnet generates a first magnetic force when said user is touching said mouse device and a second magnetic force when said user is not touching said mouse device, wherein said first magnetic force is less than said second magnetic force.

18. The mouse device of claim 17 wherein said first magnetic force is zero.

19. The mouse device of claim 15 wherein said user input device adjusts the strength of said second magnetic force.

20. The mouse device of claim 15 further comprising:

a cable for connecting said mouse device to a computer, said cable including an electrical path for providing current to said electromagnet wherein said electrical path for providing current to said electromagnet is a same electrical path used by said mouse device to operate other circuitry in said mouse device.

21. The system of claim 15 wherein said magnetic force is consistent over the entire mouse-pad.

22. A computer mouse device and mouse pad system comprising:

a computer mouse device for controlling the position of a cursor within a display device;

a mouse-pad for use in connection with said mouse device;

a sensor for sensing the angle of one of said mouse and said mouse pad relative to a horizontal plane;

wherein one of said mouse device and said mouse pad comprises an electromagnet and the other comprises a ferromagnetic material wherein said electromagnet is adapted to exert sufficient magnetic force relative to said ferromagnetic material to hold said mouse from moving relative to said mouse-pad when said mouse-pad is at an angle relative to horizontal with said mouse in contact with said mouse pad; and circuitry for adjusting a force of said electromagnet responsive to said sensor.

* * * * *